July 7, 1953  B. KELLEY  2,644,536
AIR DISPLACEMENT ROTOR WITH STABILIZING WEIGHTS
Filed Dec. 24, 1948
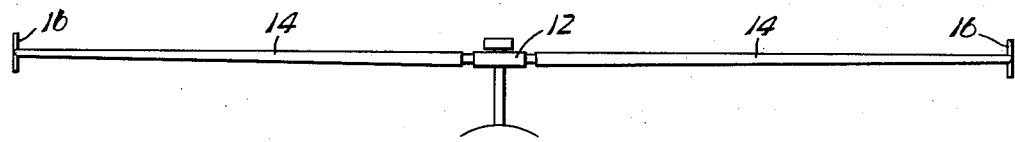
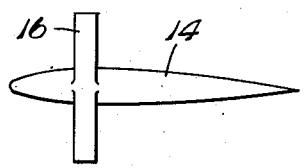
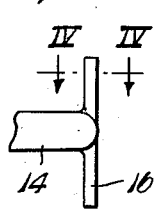
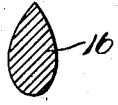
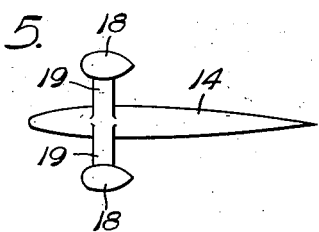
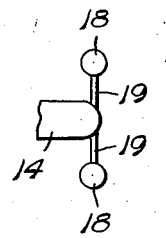
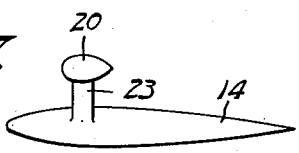
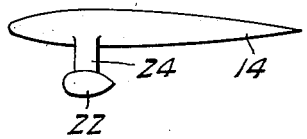
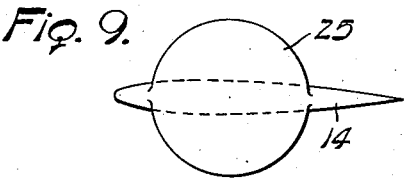
INVENTOR
Bartram Kelley
BY
Bean, Brooks, Buckley & Bean
ATTORNEYS Patented July 7, 1953

2,644,536

UNITED STATES PATENT OFFICE 2,644,536

AIR DISPLACEMENT ROTOR WITH BLADE STABILIZING WEIGHTS

Bartram Kelley, Buffalo, N. Y., assignor to Bell Aircraft Corporation, Wheatfield, N. Y.

Application December 24, 1948, Serial No. 67,234

9 Claims. (Cl. 170—159)

This invention relates to rotors, and more specifically to improvements in rotating airfoil blades such as for example rotors and control means thereof as used in rotary wing aircraft for lift purposes.

One of the objects of the invention is to reduce the tendency of a rotating blade to twist toward zero angle of attack in response to the secondary centrifugal forces in the rotating blade.

Another object of the invention is to reduce the gyroscopic coupling effect which tends to twist a rotating blade about its spanwise axis when it flaps or deflects about a chordwise axis; thereby producing a smoother operation and minimizing vibratory forces transmitted to the linkage at the root of the blade.

Another object of the invention is to provide an improved rotor blade embodying means operable to reduce transient influences of air gusts on the rotor blade tip path plane; thereby rendering the rotor inherently more stable and thereby providing a rotary wing aircraft which is more comfortable and safer and easier to operate.

Another object of the invention is to provide in a rotary wing aircraft rotor blade local approximate polar symmetry of mass about the spanwise axis of the blade, while forming the major portion of the blade to conform to ideal aerodynamic sectional profile.

Another object of the invention is to provide in rotary wing aircraft or the like lift rotor means of improved quietness of operation.

Other objects and advantages of the invention will appear in the specification hereinafter.

In the drawing:

Fig. 1 is a front elevational view of a helicopter aircraft rotor of the invention;

Fig. 2 is a tip end view thereof on a larger scale;

Fig. 3 is a fragmentary enlarged front elevational view of a tip end portion thereof;

Fig. 4 is a section on an enlarged scale along line IV—IV of Fig. 3;

Fig. 5 is a tip end view similar to Fig. 2 showing a modified form of the invention;

Fig. 6 is a fragmentary front elevation corresponding to Fig. 3, but relating to the construction of Fig. 5;

Figs. 7—8—9 are tip end views corresponding to Figs. 2 and 5, but showing other modified forms of the invention; and Fig. 10 is a front elevational view corresponding to Figs. 3 and 6, but relating to the construction of Fig. 9.

The invention contemplates addition of mass to the aerodynamically active portion of a rotor blade so as to be integral with the blade while extended therefrom in a direction normal to the plane containing the chord line and the spanwise axis of the blade; with a view to compensating for the elongated distribution of the mass of the aerodynamically active portion of the blade (in the direction of the chord line) so as to obtain locally substantial polar mass symmetry about the spanwise axis of the blade. Inasmuch as the aerodynamically active portion of the blade must of necessity be of streamlined sectional form elongated in the direction of the chord line, it is impossible to shape the blade per se to a circular sectional form so as to attain polar symmetry, and therefore it is requisite that supplemental mass be attached to an aerodynamically contoured blade so as to combine with the mass thereof to provide the desired distribution at a local region of the blade. More particularly, due to the fact that a rotor blade is invariably flexible to some degree and that the tip end portion thereof receives the greatest aerodynamic disturbances, it is most effective to attach the supplemental mass at or near the tip end of the blade.

The expression "polar symmetry" as herein used may be explained as follows: An elongated bar has polar symmetry about its longitudinal axis and its moment of inertia has the same value about any axis intersecting the longitudinal axis at right angles, and it should be noted that this condition can exist even if the cross section of the bar is not circular.

Thus, as illustrated in Figs. 1–4, a helicopter rotor comprises a hub 12 and radially extending blades 14—14 fitted at their tip ends with bar like mass members 16—16. Preferably the members 16—16 will be formed of heavy weight metal such as tungsten alloy or the like so as to obtain maximum supplemental mass effects with minimum aerodynamic drag losses. Also, it is to be particularly noted that the supplemental mass members are preferably shaped to minimum dimensions in directions parallel to the chord line of the blade so as to obtain maximum mass distribution correction in return for the added weight. Thus, as illustrated in Figs. 1 and 3, the supplemental member 16 is preferably of thin dimension in front view, and sectionally streamlined as shown in Fig. 4 to minimize aerodynamic drag losses and disturbances; and as illustrated in Fig. 2 the member 16 is preferably slim in side view and extended in a direction substantially normal to the blade chord line the necessary distance.

Figs. 5-6 illustrate a modified form of supplemental mass comprising an arrangement wherein mass members 18—18 are supported upon relatively thin struts 19 extending from the blade tip as in the manner of the members 16 of Fig. 1. Preferably, the members 18 will be aerodynamically streamlined as illustrated in the drawing. Thus, it will be appreciated that the arrangement of Figs. 5-6 is similar to that of Figs. 2-3 except that the supplemental mass is more highly concentrated at positions remote from the blade per se.

Figs. 7-8 correspond to Fig. 5 but illustrate modified forms of the invention wherein supplemental masses 20—22 are mounted upon corresponding struts 23—24 to be thereby extended respectively, above and below the blade structure per se. These arrangements are illustrated because of the possibility that unsymmetrical drag may be employed to impose twisting moments on the blade for stabilizing effects.

Figs. 9-10 illustrate another form of supplemental mass arrangement of the invention, wherein the rotor blade tip is fitted with a disc of relatively heavy metal as indicated at 25. It will be understood that in this case the inherent polar symmetry of the disc 25 will operate locally to substantially overcome the polar asymmetry of the blade structure because of the relatively heavy weight of the material of the disc 25 and its location at the position of maximum effectiveness, that is, at the tip of the rotor blade.

Whereas, in the drawing herein the supplemental mass members are in each case illustrated to be located at the position of their maximum effectiveness, it is contemplated that the supplemental mass members may be located at any other spanwise position on the blade, such as may be preferred in view of other considerations.

It has been found by tests on full scale helicopters of various sizes that the invention provides a smoother operating rotor and eliminated vibrations previously felt in the cyclic control stick whenever it was rapidly displaced, and also greatly reduced the rotor noise. It will of course be appreciated that although only a few specific structural arrangements embodying the invention have been illustrated and described herein that various changes may be made therein without departing from the spirit of the invention or the scope of the appended claims.

I claim:

1. An elongate flexible rotor blade for air displacement purposes, said blade having its major portion shaped to conform substantially to aerodynamic sectional profile, and an auxiliary mass additional to the structural requirements of said blade aerodynamic portion mounted integrally with said blade adjacent the tip end portion thereof and extending therebeyond in a direction normal to the plane containing the chord line and the spanwise axis of the blade, the projected area of said mass on the plane of said blade being confined within the chordwise extent of said blade.

2. An elongate flexible rotor blade for air displacement purposes, said blade having its major portion shaped to conform substantially to aerodynamic sectional profile, and an auxiliary mass additional to the structural requirements of said blade aerodynamic portion mounted integrally with said blade adjacent the tip end thereof and extended therebeyond in a direction normal to the plane containing the chord line and the spanwise axis of the blade, the projected area of said mass on the plane of said blade being confined within the chordwise extent of said blade, and said auxiliary mass being unsymmetrical about said plane whereby to impose a twisting moment on said blade for stabilizing effect.

3. An elongate flexible rotor blade for air displacement purposes, said blade having its major portion shaped to a typical aerodynamic sectional profile, and an auxiliary mass additional to the structural requirements of said blade aerodynamic portion mounted integrally with said blade adjacent the tip end thereof and extended therebeyond in a direction normal to the plane containing the chord line and the spanwise axis of the blade, the projected area of said mass on the plane of said blade being confined within the chordwise extent of said blade, and said auxiliary mass being substantially equally disposed on opposite sides of said blade whereby to provide in combination with that portion of the blade to which it is attached substantial polar mass symmetry about the spanwise axis of the blade.

4. A rotor blade as defined in claim 3, wherein said auxiliary mass is in the form of a bar.

5. A rotor blade as defined in claim 3, wherein said auxiliary mass comprises plural mass members spaced from said blade and supported upon struts.

6. A rotor blade as defined in claim 3, wherein said auxiliary mass is in the shape of a disc.

7. A rotor blade as defined in claim 2, wherein said auxiliary mass comprises a mass member spaced from said blade and supported upon a strut.

8. A rotor blade as defined in claim 2, wherein said auxiliary mass extends beneath said blade.

9. A rotor blade as defined in claim 2, wherein said auxiliary mass extends above said blade.

BARTRAM KELLEY.

References Cited in the file of this patent

UNITED STATES PATENTS

| Number | Name | Date |
|---|---|---|
| 1,032,729 | Baker | July 16, 1912 |
| 1,715,427 | Pitcairn | June 4, 1929 |
| 1,919,089 | Breguet | July 18, 1933 |
| 2,426,742 | Pawlowski | Sept. 2, 1947 |
| 2,430,948 | Platt | Nov. 18, 1947 |
| 2,537,393 | Bisch | Jan. 9, 1951 |

FOREIGN PATENTS

| Number | Country | Date |
|---|---|---|
| 55,613 | Netherlands | Nov. 15, 1943 |